US010715198B2

(12) United States Patent
Papa et al.

(10) Patent No.: US 10,715,198 B2
(45) Date of Patent: Jul. 14, 2020

(54) ANTENNA INTEGRATED RADIO WITH WIRELESS FRONTHAUL

(71) Applicant: Parallel Wireless, Inc., Nashua, NH (US)

(72) Inventors: Steven Paul Papa, Windham, NH (US); Rajesh Kumar Mishra, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/241,527

(22) Filed: Jan. 7, 2019

(65) Prior Publication Data

US 2019/0140683 A1    May 9, 2019

Related U.S. Application Data

(63) Continuation of application No. 15/597,095, filed on May 16, 2017, now Pat. No. 10,177,806, which is a continuation of application No. 15/263,365, filed on Sep. 12, 2016, now Pat. No. 9,654,168.

(60) Provisional application No. 62/217,557, filed on Sep. 11, 2015.

(51) Int. Cl.
| *H04B 1/40* | (2015.01) |
| *H04W 88/08* | (2009.01) |
| *H04B 7/0413* | (2017.01) |
| *H04B 7/155* | (2006.01) |
| *H04W 84/18* | (2009.01) |
| *H04W 88/06* | (2009.01) |

(52) U.S. Cl.
CPC ............. *H04B 1/40* (2013.01); *H04B 7/0413* (2013.01); *H04W 88/085* (2013.01); *H04B 7/155* (2013.01); *H04W 84/18* (2013.01); *H04W 88/06* (2013.01)

(58) Field of Classification Search
CPC ....... H04B 1/40; H04B 7/155; H04W 88/085; H04W 88/06; H04W 84/18
See application file for complete search history.

(56) References Cited

U.S. PATENT DOCUMENTS

| 9,742,535 B2 | 8/2017 | Lorca Hernando |
| 2009/0170543 A1 | 7/2009 | Mostafa et al. |
| 2012/0093084 A1 | 4/2012 | Wala et al. |

(Continued)

FOREIGN PATENT DOCUMENTS

| KR | 20150048624 A | 5/2015 |
| WO | 2016145371 A2 | 9/2016 |

*Primary Examiner* — Dac V Ha
(74) *Attorney, Agent, or Firm* — Michael Y. Saji; David W. Rouille

(57) ABSTRACT

A system is disclosed, comprising: a wireless fronthaul access point coupled to a radio mast and in communication with a remote baseband unit, the wireless fronthaul access point further comprising a first millimeter wave wireless interface; and an antenna-integrated radio for providing access to user equipments (UEs), mounted within line of sight on the radio mast with the wireless fronthaul access point, the antenna-integrated radio further comprising: a second millimeter wave wireless interface configured to receive the digital I and Q signaling information from the remote baseband unit wirelessly via the wireless fronthaul access point, wherein the wireless fronthaul access point thereby wirelessly couples the remote baseband unit and the antenna-integrated radio.

13 Claims, 4 Drawing Sheets

(56) References Cited

U.S. PATENT DOCUMENTS

| | | |
|---|---|---|
| 2014/0313984 A1 | 10/2014 | Diamond et al. |
| 2014/0378047 A1 | 12/2014 | Kennard |
| 2015/0163794 A1* | 6/2015 | Liang .................. H04W 72/042 370/329 |
| 2016/0094318 A1* | 3/2016 | Shattil .................... H04B 7/026 375/267 |
| 2016/0255613 A1* | 9/2016 | Faerber ................ H04W 16/10 370/330 |
| 2017/0064579 A1* | 3/2017 | Park .................. H04W 28/0268 |
| 2018/0343567 A1* | 11/2018 | Ashrafi .................. H04B 7/024 |

* cited by examiner

ANTENNA INTEGRATED RADIO WITH WIRELESS FRONTHAUL

CROSS-REFERENCE TO RELATED APPLICATIONS

This application is a continuation under 35 U.S.C. § 120 of U.S. patent application Ser. No. 15/597,095, filed May 16, 2017, and entitled "Antenna-Integrated Radio with Wireless Fronthaul," which itself is a continuation of, and claims the benefit of priority under 35 U.S.C. § 120 of, U.S. patent application Ser. No. 15/263,365, filed Sep. 12, 2016, and entitled "Antenna-Integrated Radio with Wireless Fronthaul," which itself is a non-provisional conversion of, and claims the benefit of priority under either 35 U.S.C. § 119(e) or § 120 of, U.S. Provisional Patent Application No. 62/217,557, filed Sep. 11, 2015 and entitled "Antenna-Integrated Radio with Wireless Fronthaul," each of which are hereby incorporated by reference in its entirety for all purposes. The present application also hereby incorporates by reference U.S. Pat. No. 8,879,416, "Heterogeneous Mesh Network and a Multi-RAT Node Used Therein," filed May 8, 2013, and U.S. patent application Ser. No. 14/853,647, "Low-Latency Inter-eNodeB Coordinated Multi-Point Transmission," filed Sep. 14, 2015, each in their entirety for all purposes.

BACKGROUND

Currently, antenna-integrated radios exist. These are devices that integrate antennas with remote radio heads (RRHs). A remote radio head includes power amplifiers (PAs), filters, antennas, and a digital interface. Radio signals are received at the antenna, translated into digital format at the integrated RRH, and sent over a CPRI interface to a baseband unit located separate from the antenna-integrated radio.

Also known in the art is multiple-in, multiple out (MIMO). MIMO provides increased data rates, and uses multiple antennas to do so. For an example of a remote radio head, see U.S. Pat. App. No. US20110158081, hereby incorporated by reference in its entirety.

A 2×2 MIMO remote radio head typically includes the following components. A common public radio interface (CPRI) interface may be provided from a baseband unit, which handles processing of all radio signals, into a digital board. The digital board may be coupled to a software-defined radio (SDR). The software defined radio may provide two transmit and two receive channels, with the transmit channels being coupled to power amplifiers (PAs) and the receive channels being coupled to low-noise amplifiers (LNAs). The channels may then be coupled to one or more appropriate filters. The filters may be connected to the antennas via connectors.

SUMMARY

In one embodiment, a system is disclosed, comprising: a wireless fronthaul access point mounted on a radio mast and configured to receive digital I and Q signaling information from a remote baseband unit for a plurality of radios, the wireless fronthaul access point further comprising a first millimeter wave wireless interface; and an antenna-integrated radio for providing access to user equipments (UEs), mounted within line of sight on the radio mast with the wireless fronthaul access point, the antenna-integrated radio further comprising: a second millimeter wave wireless interface configured to receive the digital I and Q signaling information from the baseband unit via the wireless fronthaul access point and facing toward the wireless fronthaul access point, a software-defined radio (SDR) configured to receive the digital I and Q signaling information and output a radio signal, a power amplifier coupled to the SDR and configured to amplify the radio signal from the SDR, a radio frequency (RF) filter coupled to the power amplifier and configured to filter the radio signal from the power amplifier, and an antenna facing away from the wireless fronthaul access point and coupled to the RF filter for transmitting the radio signal, thereby providing access to user equipments (UEs) via the transmitted radio signal; wherein the wireless fronthaul access point thereby wirelessly couples the remote baseband unit and the antenna-integrated radio.

The antenna-integrated radio provides a single channel of a multi-channel multiple input, multiple output (MIMO) antenna configuration. The antenna-integrated radio may be configured to provide Long Term Evolution (LTE) wireless access to UEs, and wherein the wireless fronthaul access point may further comprise an optical fiber or Ethernet connection to the remote baseband unit. A second and a third antenna-integrated radio may also be provided for providing three sector coverage of an area, mounted on the radio mast in a triangular configuration with the antenna-integrated radio, each in communication with the wireless fronthaul access point for digital I and Q signaling information from the baseband unit. A second antenna-integrated radio may also be provided, the antenna-integrated radio and the second antenna-integrated radio further comprising a synchronization chip or using global positioning system (GPS) hardware for synchronization. The first and second millimeter wave wireless interfaces may 60 GHz WiGig interfaces, and wherein the antenna-integrated radio may further comprise an additional Wi-Fi radio and an additional 60 GHz WiGig interface. The antenna-integrated radio may be in communication with adjacent antenna-integrated radios mounted on the radio mast via a WiGig mesh network and may be configured for coordinated multiple-in, multiple-out (MIMO) operation with the adjacent antenna-integrated radios. The antenna-integrated radio may be configured to couple to a zero-insertion force (ZIF) docking power socket as its only physical connection on the radio mast.

DETAILED DESCRIPTION

Figure 1:
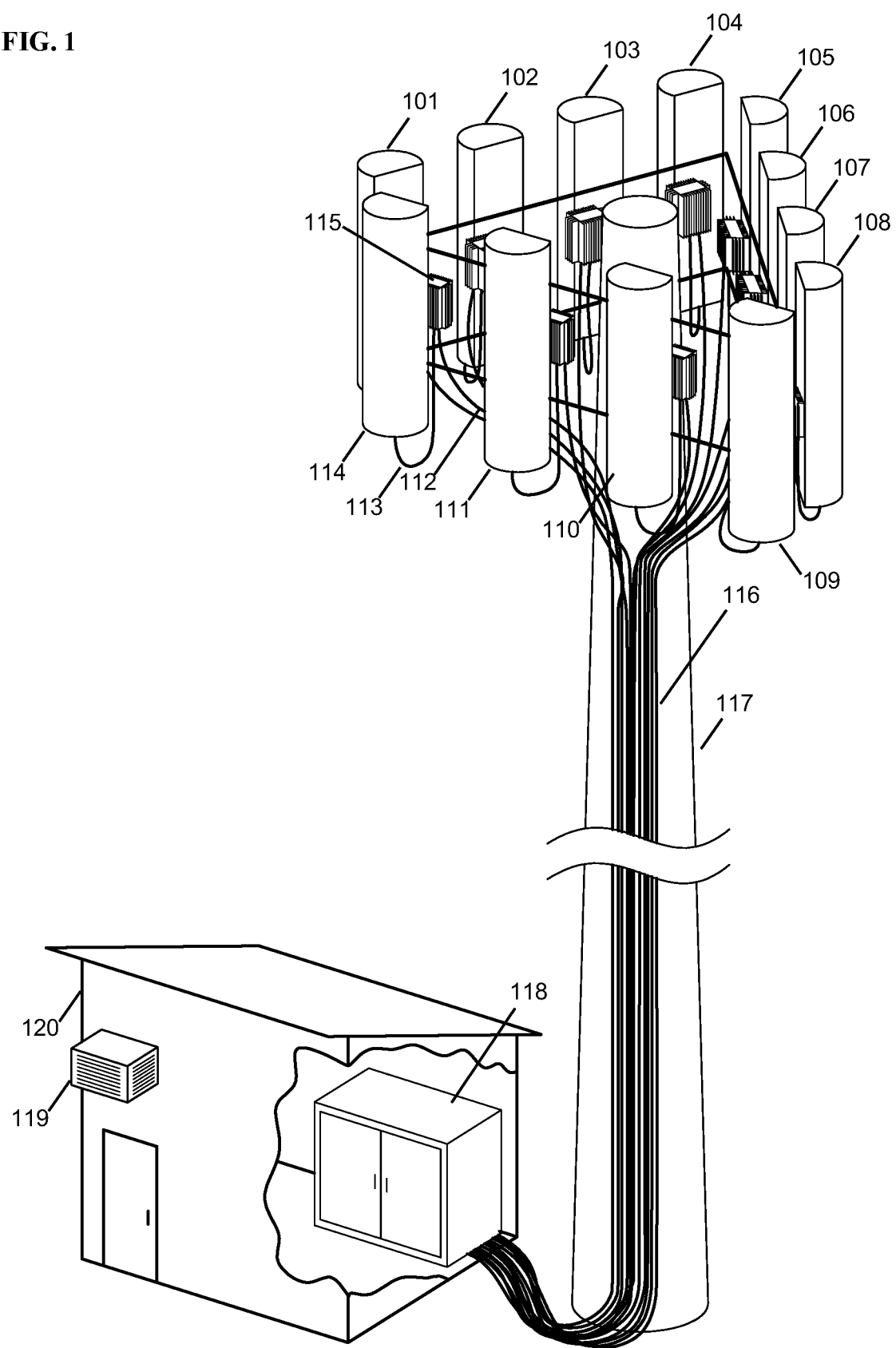
FIG. 1 is a schematic diagram of a first prior art radio architecture utilizing cabinet-based power amplification.

One way to understand the radio access network landscape is to separate it into its constituent parts. The radio access network involves a baseband processing chain for providing digital radio, a radio head that interfaces with the baseband and that includes antennas and power amplifiers, and orchestration software. This application focuses on advancing the state of the art in the radio head.

Currently, radio heads have various problems. One problem is that power amplifiers are very inefficient. Power amplifiers (PAs) take an input signal and turn it into an output signal at a higher power. However, only roughly 10% to 40% of the power used by the PA is actually turned into radio transmission power. As PAs generate a lot of waste heat, the PAs additionally need cooling, which requires air conditioning, further consuming the power budget. It is no wonder that some have said that the cellular radio access network consumes 0.5% of all global electricity consumption.

Additionally, power is lost when a signal is transmitted over a cable. This is called cable loss. Each radio frequency (RF) cable used causes signal loss of 1-2 dBm, which can reduce the effective power of a 20 W-rated antenna to 14 W. It follows that if 20 W is desired at the antenna, 30 W is needed at the radio head, which requires an additional 100 W of power. Additionally, each RF connector also entails signal loss, called insertion loss, adding another 1 dBm of signal loss. When multiple antennas per sector are considered, it is no wonder that a great deal of power is expended simply for cooling the power amplifiers.

Another problem is fronthaul. Recently, the radio antenna functionality and baseband processing functionality that used to be combined in a base station have been separated, with a point-to-point fiber link between the baseband and the antenna, making it easier to put the radio components up on top of the cell tower and to service the baseband components. This combination of radio components are called a remote radio head, as the baseband is located elsewhere. However, the link itself, which is called fronthaul, adds an additional complication because currently only fiber is believed to have the performance characteristics needed to adequately service the radios. This is because 100 Mbps of data capacity for a digital radio requires the equivalent of multiple gigabits per second to be transported by fronthaul to the baseband for processing.

Although CPRI reduces cable loss to approximately 1.5 dBm by making the signal digital, it does not solve the problem of cable loss entirely, because MIMO requires the two antennas to be physically separated. Handling the radio signal for two MIMO antennas at a single RRH requires signals to be transported over an analog cable over at least some distance to each MIMO antenna.

Another problem is that coming generations of the LTE standard are proposed that will increase the number of radios on the tower. An increase in the number of radios permits multi-band, multi-radio access technology (multi-RAT) flexibility and performance, and provides opportunities to perform beamforming, coordinated multi-point (CoMP) inter-cell interference cancellation (ICIC), and other technologies. However, more radios mean more power, more baseband, and more fronthaul.

Another problem is electrical isolation. When lightning strikes a tower, it may cause electrical faults, as well as thermal ones. Unfortunately, since radio frequency cables are designed to be low impedance, so that they can transmit RF signals, the low impedance makes the equipment on either side vulnerable to lightning strikes. Current base station towers are equipped with isolators between each RF component to prevent lightning from causing cascading failures.

Another current area of inquiry is the appropriate and cost-effective identification and location of filters. Filters are specific to a particular frequency range, unlike wideband power amplifiers, which can handle approximately 200 MHz of a frequency range efficiently. To avoid RF loss, ideally the filter and the power amplifier will be located in the same enclosure. However, the enclosure must then handle the wide range of physical filter sizes needed to handle the different frequencies currently in use today.

Another current area of inquiry is thermal management. The power expended in the power amplifiers, baseband processors, and other aspects of the radio frequency chain is output as heat, which reduces the operational effectiveness of the system. Active heating, typically via air conditioning, is one way to cool the system. Another way is passive cooling, typically via radiative cooling using a large thermal body and convective air cooling. The level of heat being generated is reaching or exceeding the limits of what can be radiated using a thermal body of reasonable size.

The combined problems of filter and thermal management contribute to the absence of a standard, commodity radio head enclosure. Thermal engineering for a specific frequency and filter combination involves development of custom cooling and enclosures for each frequency and filter combination. Additionally, each enclosure requires careful machining of holes to avoid moisture ingress, and design to accommodate RF routing.

FIG. 1 depicts an example of a current-generation base station radio architecture with power amplification at the cabinet. In the figure, a cabinet 118 includes a baseband unit, a power amplifier, and a filter for each antenna and each frequency band on each antenna. The cabinet is also inside a shelter 120, which also includes appropriately sized air conditioning 119 to cool the baseband in the cabinet. The air conditioning needs of this cabinet, which include power amplifiers converting, for example, 40 watts per antenna into heat at 90% efficiency for a total of 400 W in heat generated from power amplification, plus the digital processing baseband and other circuitry, are substantial.

RF wires 116 lead out of the cabinet 118 up mast 117 to the antennas. Mounted on the mast are twelve antennas 101, 102, 103, 104, 105, 106, 107, 108, 109, 110, 111, and 112. Each of the antennas is fed by a single RF wire 113, which is part of the bundle of wires 116 that connects back to the cabinet. However, as the RF cables have at least 1.5 to 2 dBm signal loss on their way up the mast, a tower-mounted amplifier is required to re-amplify the signal before it is fed to each antenna. As shown, tower-mounted amplifier 115 receives the signal wire 116, amplifies the signal, and outputs it to antenna 114 via signal wire 113. The antenna configuration shown is a three-sector configuration with each sector equipped with 4×4 multiple-in, multiple-out (MIMO) capability. Each antenna has a tower-mounted amplifier. A duplexer may be present within the antennas to enable receive and transmit to be multiplexed over the same cable. The 1.5 to 2 dBm loss is the equivalent of turning 30 W of RF at the cabinet into 20 W at the antenna.

Figure 2:
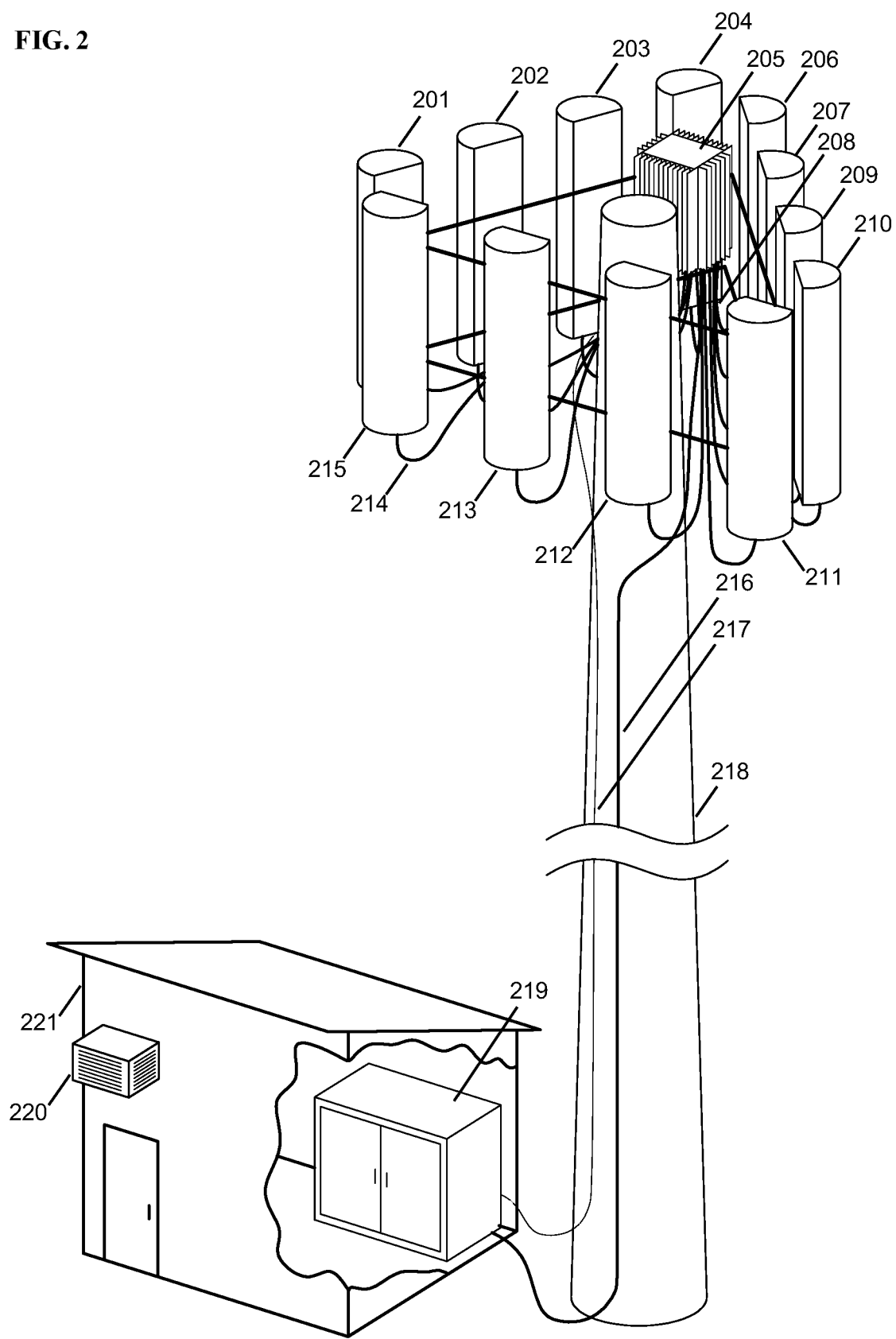
FIG. 2 is a schematic diagram of a second prior art radio architecture utilizing a remote radio head.

FIG. 2 depicts another example of a current-generation base station radio architecture, using remote radio head architecture. In the figure, a cabinet 219 includes a baseband unit. The cabinet is also inside a shelter 221, which also includes appropriately sized air conditioning 220 to cool the baseband in the cabinet, which requires less air conditioning than cabinet 118 but still requires substantial air conditioning. The baseband in the cabinet has a fiber optic output connection 217 using the common public radio interface (CPRI) protocol and small form factor pluggable (SFP) connectors to fiber The baseband also has a power output 216 to deliver power for the remote radio head. CPRI fiber extends up the pole or mast 218 to the radio head 205 (although the point of connection is not shown), which is on the tower but not at the antenna. The radio head 205 has an CPRI interface to the baseband unit, and has RF cable connections to each of the twelve antennas 201, 202, 203, 204, 206, 207, 209, 210, 211, 212, 213, 215. The antennas are arranged in the figure as four antennas for each of three sectors. The radio head takes the output of the CPRI interface, which is digital, turns it into an analog radio frequency signal, amplifies it through a PA, and performs filtering through a filter, before sending it through radio frequency cables to each antenna; all the RF cables exit as shown at cable bundle 208, and connect to the antennas; for example, RF cable 214 connects RRH 205 to antenna 215. Less air conditioning is needed, as the radio head is air cooled. However, the radio frequency cables have significant RF signal loss of at least 0.5 dB.

A new approach is suggested to ameliorate these problems. Greater flexibility, as well as reduced signal loss and consequently reduced power consumption, are made possible using the disclosed approach. One or more of the following components may be combined to create an improved base station.

Firstly, a wireless fronthaul access point is proposed. A multi-sector base station tower is typically configured with radio heads mounted in a triangular configuration. By placing a wireless fronthaul access point in the center of the triangle, the base station can be located very close to the RRHs, i.e., within line of sight or in some cases within approximately 5 meters. This proximity allows the use of high-bandwidth radio technologies, such as Wi-Gig, to provide multi-gigabit (5-10 Gbps) bandwidth to each radio head, to take the place of CPRI and provide fronthaul for all I and Q signals going into and coming out of the antennas.

Second, each radio head is configured to include an antenna, SDR, filter, and PA or LNA for a single channel of a multi-channel MIMO configuration. Using the example of a 2×2 MIMO installation, each radio head provides a "half-RRH" or "single-channel RRH," with its output remotely controlled by the baseband unit.

Third, MIMO installations have not previously split signals from a single MIMO configuration across devices. The reason is that processing of antenna signals needs to be performed together. Greater coordination and synchronization among the baseband units enables this. Specifically, higher degrees of synchronization, up to and including 1 part per billion of synchronization, are combined with rapid processing and high-bandwidth wireless links to enable separate, coordinated processing of the individual RRH signals.

Fourth, the use of wireless fronthaul ensures that each antenna requires only power to be physically connected. A physical docking system is described that provides power and additional features, such as orientation configurability, while only requiring an antenna system to be dropped in with a small degree of force to connect to power.

A configurable, rapidly-deployable, high-performance base station is thereby enabled by the combination of one or more of these components.

Small cell systems on a chip (SOCs) may be used to drive a small form factor baseband board colocated with an antenna. The baseband board may have the processing power to provide wireless access to users on a wireless access network. Multiple such baseband-integrated antennas may be combined to provide multi-sector wireless access service.

Wireless radios may be integrated into the antennas for short-distance inter-antenna communication. The radios may operate at a high frequency, such as millimeter-wave or 60 GHz, and may be WiGig, 802.11ad, or other wireless radios; these radios will be referred to as WiGig radios in this disclosure. At high frequencies such as used by these radios, high data rates are possible, sufficient to handle the digital data demands for digital fronthaul traffic, with minimal interference to the reception and transmission frequencies of the radios. The wireless range limitations of frequency bands in the tens of gigahertz (i.e., microwave or millimeter wave) are not problematic, as the antennas are co-located/mounted on the same radio tower. Moreover, the WiGig radios can replace two RF cables and 4 connectors, significantly mitigating power loss. The antennas may thus be feederless, using wireless for the "last inch" of fronthaul.

The bandwidth required for a wireless fronthaul interface depends on the backhaul bandwidth needed for connected user devices. A typical LTE frequency band requires either 10 or 20 MHz of bandwidth. When multiple-in, multiple-out (MIMO) technologies are used, the bandwidth required for 10 MHz ranges from 1.2 Gbps for 10 MHz, 2×2 MIMO to 9.8 Gbps for 20 MHz, 8×2, 8×4, 8×8 MIMO. WiGig currently supports 7 Gbps, enabling fronthaul for all but the 20 MHz 8×8 MIMO case, and future wireless technologies using higher-rate radios may also be incorporated to support such cases. The fronthaul connection may also accommodate MIMO, ICIC, DPD, and other digital processing scenarios. The fronthaul connection may also accommodate compression of the raw digital signal, in some scenarios, such as lossless I/Q compression or frequency domain compression.

Unlike with other remote radio head solutions, in some embodiments, an entire baseband board may be placed inside each antenna. In the case of a MIMO antenna, which is configured to be used as one of multiple antennas, the baseband board may be enabled to handle the input and output streams for that specific antenna. One power amplifier may be located in each antenna as well. The WiGig radio may be used as fronthaul, replacing a fiber connection. Heat dissipation may be improved by leveraging of the antenna thermal mass. Low-bandwidth digital signals are input into the antenna, high-bandwidth digital fronthaul is avoided or is transmitted over high-bandwidth digital wireless signals, and RF signal loss is reduced, along with power consumption. The combined unit is able to be manufactured at scale for significantly reduced cost.

In some embodiments, instead of using a single fronthaul WiGig access point for the central WiGig controller, one wireless fronthaul integrated antenna may act as a master, and other integrated antennas may act as slaves. In some embodiments, a resilient master-slave architecture may be used such that another antenna may automatically provide failover for a base station. In some embodiments, one master antenna may have multiple slaves.

In some embodiments, backhaul may also be wireless. A lower-bandwidth wireless interface may be used, including another WiGig interface or a Wi-Fi interface. Backhaul to one antenna may be shared with other antennas, in a mesh network.

In some embodiments, when the only required physical interface is power, installation and maintenance are significantly improved. Current methods for troubleshooting errors when a remote data connection is unavailable entail a technician climbing the tower to reach the errant antenna. When the antenna is significantly less expensive, the entire antenna module may simply be replaced. In some embodiments, a replacement antenna may be installed via drone, or using a less-expensive technician to connect power.

As the physical enclosure requires only power and/or a wired Ethernet port, the RF connector machining requirements may be relaxed, and the cost of the enclosure itself may be reduced. The enclosure may be a simple block of cast metal, large enough for a single filter appropriate for any frequency band. Minimal holes may be machined. A radio-transparent section may provide egress for radio frequency signals. The radio-transparent section may be configured on the tops and the bottoms of the enclosure, such that the antennas provide visibility to all other antenna modules on the tower, as well as the wireless backhaul connection antenna. Although WiGig signals do not penetrate ice and snow, the thermal dissipation from the antenna module, particularly in the transparent region, is anticipated to result in melting of such snow or ice.

In some embodiments, filters may include, for example, cavity filters, or ceramic filters. Filters may be made of cast aluminum (in particular for cavity filters), or from ceramic. Filters may be combined for multiple bands of operation. Filters may be of varying sizes for handling radio bands with different wavelengths.

In some embodiments, reducing dB loss by 0.5 can result in a 10% reduction in power amplifier power output, which can save 10% of the energy consumption budget of the PA. This power savings can be canceled out by the power consumption of the baseband unit. However, as the power is consumed at both the baseband board and the power amplifier, cooling requirements are still improved over the use of a highly power-consuming power amplifier. Another difference in heat generation is that the power amplifiers, which used to be centralized across multiple antennas within a single baseband unit, are not spread out over multiple antennas. This also improves cooling requirements. Total reduction of thermal mass is 10-20%.

An additional benefit of locating the power amplifier in the antenna is increased power amplifier resiliency. Even if one power amplifier fails, its failure is contained to the particular antenna it is located in. This is in contrast to traditional installations, where power amplifier failures can cascade. Power amplifiers typically fail due to overheating. When they are contained together within a single cabinet, more than one of them may fail at once due to heat-related issues or lightning. This likelihood is reduced when the PAs are physically separated.

Another benefit is electrical isolation. Using wireless fronthaul removes the need to connect antennas and other components using low-impedance RF cable, thereby providing near-complete electrical isolation. This has a side benefit of reducing complexity by eliminating the need for electrical isolators between each component, and this reduction in complexity allows operators to more easily troubleshoot and maintain the equipment.

Without tower amplification and RF loss, sensitivity is improved on the receive side. No significant cabinet being needed, rooftop installation is simplified. Multiple bands may be enabled using multiple antenna modules, each mounted to a single antenna or single tower. The tower need only provide adequate space for RF filters of the appropriate frequency band.

Figure 3:
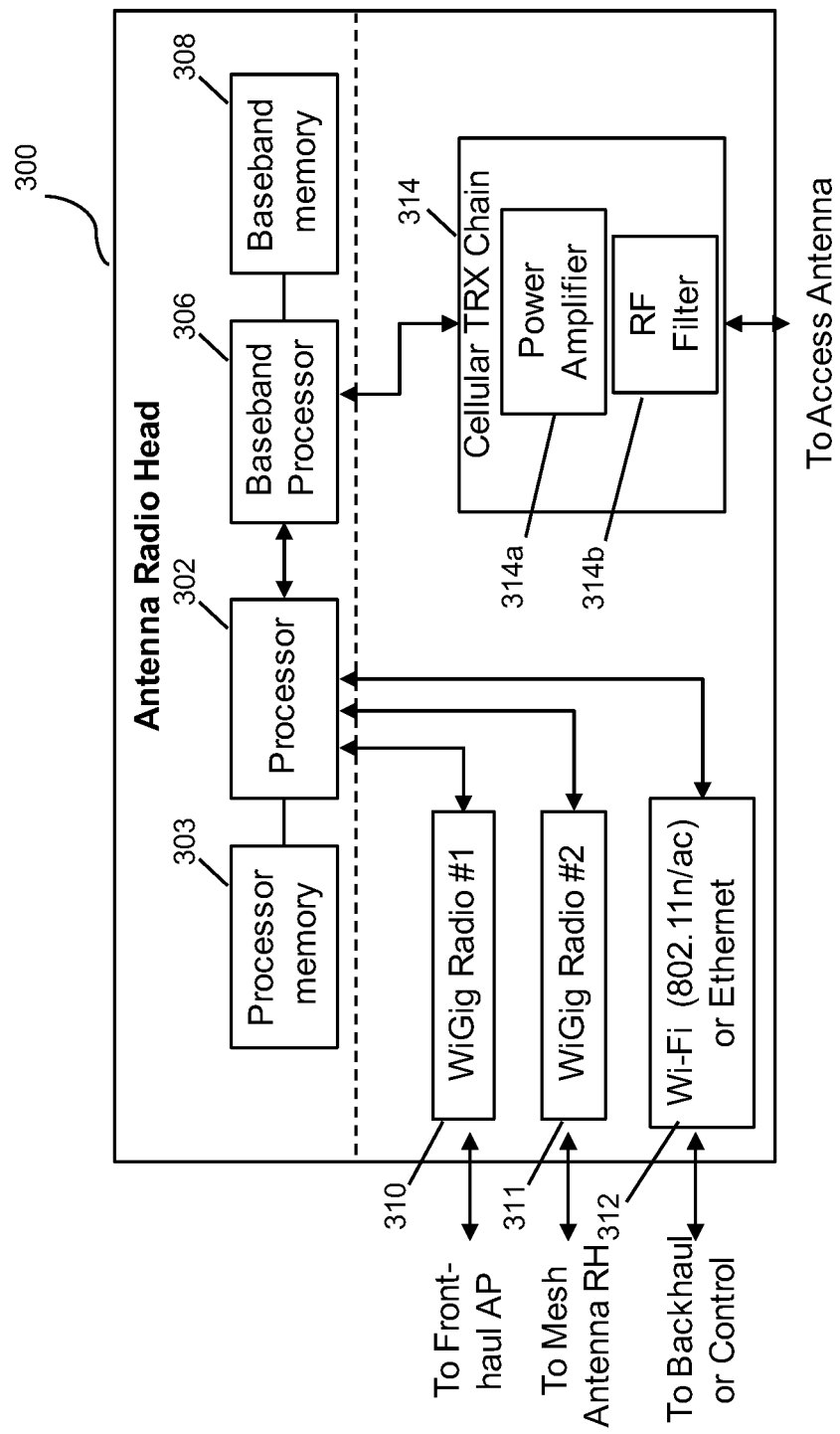
FIG. 3 is a schematic diagram of an antenna-integrated radio with wireless fronthaul capability, in accordance with some embodiments.

FIG. 3 shows the components that would be used in such a device. Integrated antenna radio head 300 includes the following components. A processor 302 is connected to a processor memory 303, which may be used together to perform operations described herein. Processor 302 is connected to a first WiGig radio 310, which is connected to a fronthaul AP (not shown) via WiGig at a high data rate, and to the processor 302. Processor 302 is also connected to a second WiGig radio 311, which is connected to another radio head via another WiGig connection. Processor 302 is also connected to a backhaul connection 312, which may be a 802.11n/ac connection or an Ethernet connection. The WiGig radios provide their own on-chip antennas, in some embodiments. Processor 302 may provide routing or switching between interfaces 310, 311, and 312 and may receive digital I and Q data from the backhaul connection or the WiGig fronthaul and may send the digital I/Q to the baseband processor. A baseband processor 306 may be connected to the processor 302 and to a baseband memory 308. The baseband processor 306 is connected to the cellular transmit/receive (TRX) chain 314 of the antenna radio head, which includes power amplifier 314a and RF filter 314b for transmission, as well as other RF functions, such as a duplexer for processing received RF signals. The cellular TRX chain receives analog RF I and Q from the baseband processor 306 and outputs it to the access antenna (not shown).

An IEEE 802.11n Wi-Fi radio may be used to provide additional backhaul support, with or without Ethernet backhaul. A baseband board may be provided to perform all baseband functions specific to this antenna. The baseband board may include DPD and CFR functions, as well as self-test routines and modules, as well as handling for one or more channels of MIMO, or one or more channels of multiple radio access technologies, e.g., 2G, 3G, 4G, UMTS, LTE, and the like. A system-on-chip may be used for any combination of these components. The enclosure may include two WiGig radios. One of the WiGig radios may connect to a wireless fronthaul access point (AP) located at the center of the mast. As the WiGig antennas have limited range, it is useful that the fronthaul AP is located within line of sight and within a short distance away, for all antennas on the mast. In some embodiments, one WiGig radio may connect to another antenna on the base station; in other embodiments, an additional WiGig antenna may be provided for redundancy. The enclosure may also include a power amplifier and a filter, and the physical antenna component. The power amplifier could be a 30 W power amplifier, in some embodiments. The enclosure needs only to have power, and optionally wired Ethernet. With a traditional enclosure, the holes require careful drilling that is different for each application. Here, as the enclosure thus has fewer holes, it is more reproducible and less expensive to produce, as well as having fewer holes for water ingress.

Figure 4:
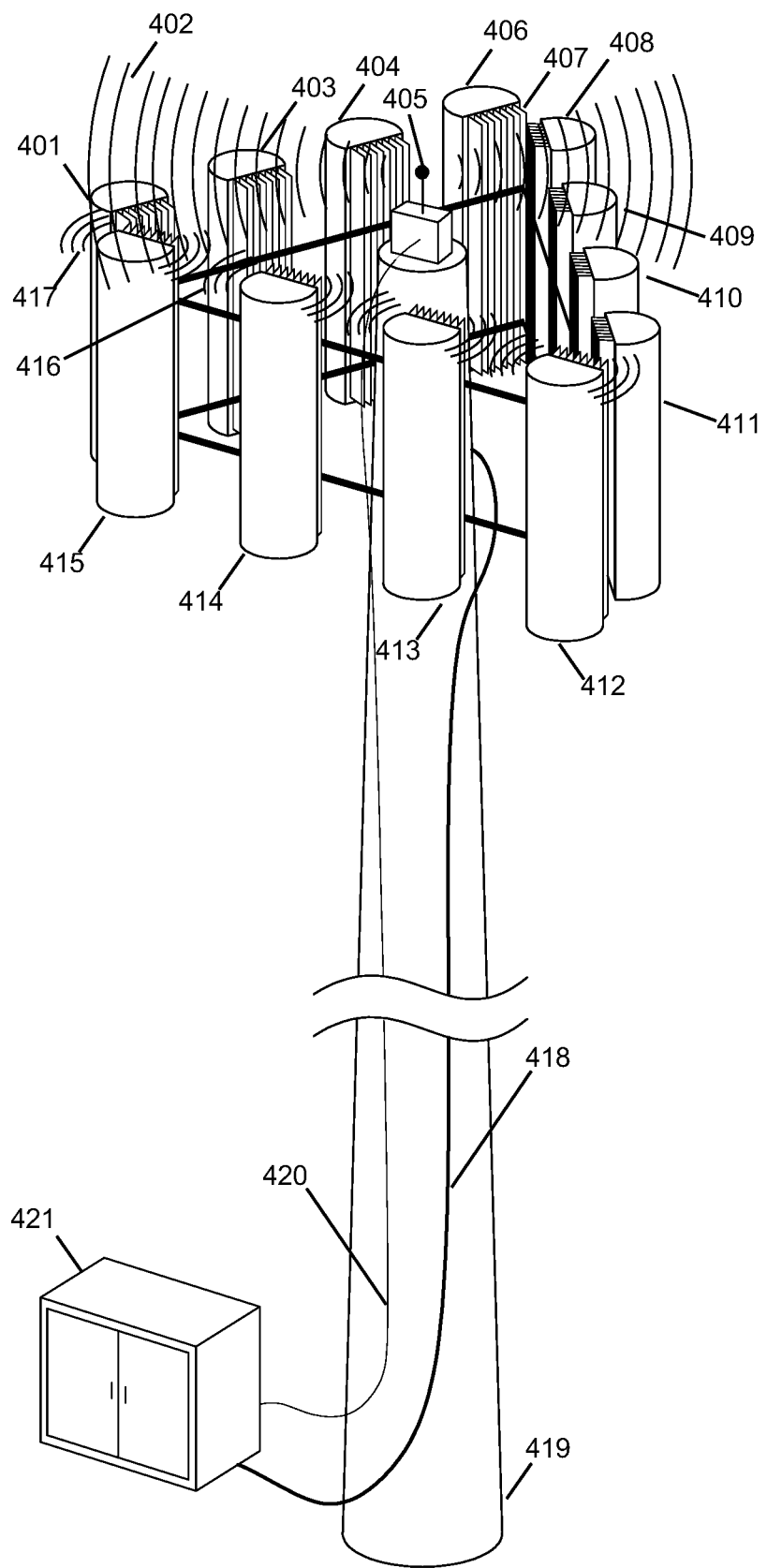
FIG. 4 is a schematic diagram of a radio architecture utilizing wireless fronthaul, in accordance with some embodiments.

FIG. 4 shows a system including the embodiment of FIG. 3. At the top of mast 419, wireless fronthaul access point 405 is provided at the top of a mast 419 and fed by one wires, fiber 420 for backhaul. and power (not shown). Power 418 is also carried up the mast by a cable 418 and is distributed by a power distribution system built into the mast and connected to each antenna; ordinary 48 V DC power may also be provided to each of the antennas. Antennas 401, 403, 404, 406, 408, 409, 410, 411, 412, 413, 414, 415 are fed digital I and Q signals wirelessly by the fronthaul AP 405, which wireless signal is shown as 402; they point outward to provide access and they each have WiGig antennas pointed toward the fronthaul AP. The rear of antenna 406 shows exemplary heat dissipation fins 407, which, together with the thermal mass of the antennas, is enough to dissipate heat passively. Antennas 414 and 415 communicate in a WiGig daisy chain with antennas 415 and 417 respectively, as shown by wireless signals 416 and 417.

WiGig is used between each of the four antennas to provide fronthaul. Wi-Fi (802.11ac, in the 5 GHz band) is used for backhaul from each of the antennas. The only physical connection at the antenna may be power, in some embodiments, or Ethernet and power. No RF cable loss is entailed. No tower amplifier, combiner or splitter is required on or around the tower.

At the bottom of the mast, cabinet 421 no longer needs a shelter with air conditioning, as the reduction in power wastage and increase in thermal mass enables passive cooling at the cabinet. Therefore, no AC and no baseband unit are found at the cabinet; instead, only a passively cooled power supply and a backhaul network terminal are provided in the cabinet.

In some embodiments, a power tilt antenna chassis may be provided. In some embodiments, a winch that can lower itself and that causes the antenna to guide itself into position when it is raised can be deployed at the tower in a base or cradle for the antenna module. A drone may operate an electric latch to release an antenna module, and the antenna module may lower itself to the ground using the winch. In some embodiments, a boom and trolley may be attached at the center of a tower for attaching and detaching antenna modules. The antenna chassis and/or base may be physically designed to be self-guiding, such that a new antenna may be inserted into the base by a drone or by an operator.

In some embodiments, wireless synchronization may be used between antennas. Synchronization is important for various applications, such as time division duplexing (TDD) for certain cellular bands. Direct wireless synchronization could be provided, for example using a method such as described as in U.S. Pat. No. 9,048,979. Alternatively, each antenna subsystem may be equipped with its own GPS antenna, and the GPS antennas may be used to sync the antennas together down to approximately 50 parts per billion (ppb).

In some embodiments the industrial, scientific and medical (ISM) unlicensed radio band may be used, for wireless sync, wireless fronthaul, wireless backhaul, mesh networking, daisy-chaining, or another purpose. In some embodiments a high-bandwidth high-frequency band, such as 60+ GHz, could be used.

In some embodiments, different electrical energy transfer methods may be used. For example, a packet energy transfer protocol, such as VoltServer, or Power over Ethernet, may be used to distribute power over a wired Ethernet port to each antenna module, with no electrician needed for installation. VoltServer provides a certain amount of energy in short time slices that are akin to digital packets. VoltServer also carries data as well as energy in each packet. Using the data, VoltServer also monitors the impedance on the circuit so that power can be cut rapidly with any change in impedance. As the individual energy pulses do not contain a hazardous level of energy, VoltServer provides an alternative to high-voltage wires that pose danger to people. An energy transfer system may use high-impedance cables, such as the Ethernet cables used by VoltServer. These high-impedance cables provide electrical isolation and thereby reduce the risk of electrical failure. The data connection provided by VoltServer may be used instead of or in conjunction with wireless fronthaul, in some embodiments.

In some embodiments, the baseband boards integrated into the antennas may have sufficient processing power to perform digital pre-distortion (DPD) and/or crest factor reduction (CFR).

In some embodiments, alternative fronthaul may be employed in conjunction with, or in place of, the WiGig interfaces described above. In some embodiments, a small form factor-pluggable (SFP) patch cable fronthaul may be used, either in conjunction with or in place of the WiGig wireless fronthaul connection. An appropriate number of SFP connections may be used, if substituting for the WiGig fronthaul. Patch cables may be used without the use of SFP connectors. Fiber may be used for fronthaul between the antennas. Fiber may be laid as a backup to a dedicated baseband cabinet, using, for example, the CPRI protocol, and a software decision may be made whether to use the L2/L3 interface at the baseband cabinet or at the antennas. Enhancements for CoMP may be provided such that antenna modules may provide CoMP, or CoMP may be provided based on the level of fronthaul capacity available, e.g., if a higher-bandwidth CPRI fiber fronthaul connection is available, or if higher-bandwidth wireless fronthaul is available, a gradient of CoMP enhancements may be made available.

In some embodiments, the antenna components may be deliverable by drone and may use a zero-insertion force (ZIF) connector.

In some embodiments, the dock may include antenna tilt control. In some embodiments, the tilt control may involve a wired or wireless connector.

In some embodiments, the antenna may support a physically-wired connection.

In some embodiments, the antennas can wirelessly daisy-chain with each other, enabling increased resiliency and robustness. In some embodiments, the antennas can form a mesh network.

In some embodiments, the antennas may be configured with a Wi-Gig antenna module on the back of the cellular band antenna, such that the wireless fronthaul access point is located in a non-obstructed location for all antennas. The Wi-Gig antenna module or other gigabit wireless module may be part of the antenna on a chip in a baseband board, and may be covered by a radio-transparent radome or shield, made, for example, out of plastic. Where a heat-dissipating enclosure is used, the Wi-Gig antenna or gigabit wireless module may be physically located on the exterior of the enclosure, in some embodiments. In some embodiments, where the Wi-Gig or gigabit wireless module is located on the exterior of the enclosure and not on a baseband card, the Wi-Gig or gigabit wireless module may be physically coupled to the baseband card via a standard serial digital interface.

In some embodiments, two or more wireless fronthaul access points may be provided for additional resiliency, each located in the same location within the triangle of the tower mount.

In some embodiments, a single wireless access point may be used, and may be located, for example, in the middle of the tower between all the antennas, with each antenna receiving wireless fronthaul or wireless backhaul, or both. This may enable reduction of cost of providing all the processing power to each antenna. In some embodiments a single antenna may bear the bulk of the processing burden, and may be daisy-chained to the other antennas.

In some embodiments, the wireless fronthaul access point may have an omnidirectional antenna, or a directional antenna.

In some embodiments, multiple bands, or wireless frequencies, may be supported by each antenna and/or by the wireless fronthaul access point.

In some embodiments, the wireless fronthaul link may be a Wi-Gig link or a Li-Fi link or another type of high-bandwidth wireless link. In some embodiments, the wireless link may carry an I signal, a Q signal, and management data. Multiple bands of I and Q signals may be carried. Management data may include alarms, notifications, tilt management, and other features. In some embodiments, sync data may be carried. In other embodiments, sync data may be achieved using analysis of the wireless signals already being transmitted, such as described in U.S. Pat. No. 9,048,979, hereby incorporated herein in its entirety.

In some embodiments, alternative thermal management solutions may be provided. For example, surface mount piezoelectric cooling jet technology, such as is provided by General Electric, may be applied to increase cooling capacity without the use of air conditioning.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary.

Although the above systems and methods are described in reference to base stations for the Long Term Evolution (LTE) standard, one of skill in the art would understand that these systems and methods could be adapted for use with other wireless standards or versions thereof.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure.

The invention claimed is:

1. A system, comprising: an antenna radio head comprising:
   a processor;
   a processor memory in communication with the processor;
   a first Wireless Gigabit (WiGig) radio in communication with the processor and having a connection for a fronthaul Access Point (AP), wherein the connection for the fronthaul AP accommodates compression of a raw digital signal;
   a second WiGig radio in communication with the processor; a backhaul connection in communication with the processor;
   a baseband processor in communication with the processor;
   a baseband memory in communication with the baseband processor; and
   a cellular Transceiver (TRX) chain communication with the baseband processor wherein the system receives digital In-phase (I) and Quadrature (Q) signaling information and outputs an access radio signal, amplifies the access radio signal at a power amplifier coupled to the radio transceiver internally within the antenna radio head, filters the access radio signal and transmits the access radio signal thereby providing access to user equipments (UEs) via the transmitted radio access signal.

2. The antenna radio head of claim 1 wherein the compression of the raw digital signal comprises lossless I/Q compression.

3. The antenna radio head of claim 1 wherein the compression of the raw digital signal comprises frequency domain compression.

4. The system of claim 1, further comprising a remote baseband unit in communication with the wireless fronthaul access point and performing processing of the digital I and Q signaling information.

5. The system of claim 1 wherein the remote baseband unit sends the processed digital I and Q signaling information to the wireless fronthaul access point.

6. The system of claim 1, wherein the wireless fronthaul access point comprises an optical fiber or Ethernet connection to the remote baseband unit.

7. The system of claim 1, wherein the antenna-integrated radio further comprises a synchronization chip or global positioning system (GPS) hardware for synchronization.

8. The system of claim 1, wherein the wireless fronthaul access point further comprises a synchronization chip or global positioning system (GPS) hardware for synchronization.

9. The system of claim 1, wherein the wireless fronthaul access point is configured to accommodate multiple-in, multiple-out (MIMO), inter-cell interference cancellation (ICIC), crest factor reduction (CFR), or digital pre-distortion (DPD) processing of the digital I and Q signaling information.

10. The system of claim 1, wherein the wireless fronthaul access point is configured to provide a fronthaul access point for multiple-in, multiple-out (MIMO) signals, and further comprising a plurality of additional antenna-integrated radios synchronized with the wireless fronthaul access point to enable coordinated processing of individual MIMO signals.

11. A method, comprising:
   at an antenna-integrated radio:
   receiving, at a millimeter wave wireless interface, a digital In-phase (I) and Quadrature (Q) (I and Q) signaling information from a remote baseband unit wirelessly via a wireless fronthaul access point, the wireless fronthaul access point accommodating compression of a raw digital signal;
   receiving, at a radio transceiver, the digital I and Q signaling information to output an access radio signal;
   amplifying, at a power amplifier coupled to the radio transceiver internally within the antenna-integrated radio, the access radio signal from the radio transceiver;
   filtering, at a radio frequency (RF) filter coupled to the power amplifier internally within the antenna-integrated radio, the access radio signal from the power amplifier; and
   transmitting, at an antenna coupled to the RF filter internally within the antenna-integrated radio, the access radio signal,
   thereby providing access to user equipments (UEs) via the transmitted radio access radio signal.

12. The method of claim 11, wherein the compression of a raw digital signal comprises lossless I/Q compression.

13. The method of claim 11, wherein the compression of a raw digital signal comprises frequency domain compression.

* * * * *